US012656846B2

(12) United States Patent
Chiu et al.

(10) Patent No.: US 12,656,846 B2
(45) Date of Patent: Jun. 16, 2026

(54) ELECTRONIC DEVICE AND POWER SWITCHING CONTROL METHOD

(71) Applicant: ASUSTeK COMPUTER INC., Taipei City (TW)

(72) Inventors: I-Liang Chiu, Taipei City (TW); Zong-Yin Chen, Taipei City (TW); Teng-Chih Wang, Taipei City (TW); Guan-Heng Lai, Taipei City (TW)

(73) Assignee: ASUSTeK COMPUTER INC., Taipei City (TW)

( * ) Notice: Subject to any disclaimer, the term of this patent is extended or adjusted under 35 U.S.C. 154(b) by 110 days.

(21) Appl. No.: 18/511,966

(22) Filed: Nov. 16, 2023

(65) Prior Publication Data

US 2024/0288919 A1      Aug. 29, 2024

(30) Foreign Application Priority Data

Feb. 24, 2023    (TW) .................................. 112106985

(51) Int. Cl.
*G06F 1/26* (2006.01)
*G06F 9/445* (2018.01)

(52) U.S. Cl.
CPC .......... *G06F 1/263* (2013.01); *G06F 9/44536* (2013.01)

(58) Field of Classification Search
CPC .............................. G06F 1/263; G06F 9/44536
See application file for complete search history.

(56) References Cited

U.S. PATENT DOCUMENTS

| | | | | |
|---|---|---|---|---|
| 8,719,460 B2 * | 5/2014 | Hung | .................. | G06F 13/4068 710/15 |
| 11,119,875 B2 * | 9/2021 | Truong | ................. | G06F 1/3287 |
| 11,803,392 B2 * | 10/2023 | Xu | ........................... | G06F 1/263 |
| 12,399,218 B2 * | 8/2025 | Srinivasan | .............. | G06F 1/263 |
| 2004/0139357 A1 | 7/2004 | Lee | | |
| 2004/0215983 A1 * | 10/2004 | Kwahk | ................. | G06F 1/3215 713/300 |
| 2007/0220282 A1 * | 9/2007 | Huang | ...................... | G06F 1/26 713/300 |
| 2010/0088547 A1 * | 4/2010 | Chang | ................. | G06F 11/2284 714/36 |

(Continued)

FOREIGN PATENT DOCUMENTS

| | | |
|---|---|---|
| CN | 1991681 | 5/2010 |
| TW | 200412536 | 7/2004 |
| TW | 201207612 | 2/2012 |

*Primary Examiner* — Aurel Prifti
(74) *Attorney, Agent, or Firm* — JCIPRNET

(57) ABSTRACT

An electronic device and a power switching control method are provided. The electronic device includes a basic input/output system (BIOS), an embedded controller, and a control chip. The BIOS is configured to generate a first handshake command when executing an update mode. The embedded controller is coupled to the BIOS and includes a general-purpose input-output (GPIO) pin. The embedded controller performs a handshake procedure with the BIOS according to the first handshake command, and determines a voltage level of the GPIO pin according to the first handshake command. The control chip is coupled to the GPIO pin of the embedded controller, and is configured to determine a power switching waiting time of a power switching unit according to the voltage level of the GPIO pin.

18 Claims, 4 Drawing Sheets

(56)      References Cited

U.S. PATENT DOCUMENTS

| | | | |
|---|---|---|---|
| 2012/0191990 A1* | 7/2012 | Hodge | G06F 1/3203 |
| | | | 713/300 |
| 2017/0168747 A1* | 6/2017 | Han | G06F 9/4405 |
| 2020/0250313 A1 | 8/2020 | Li | |
| 2023/0341918 A1* | 10/2023 | Lagnado | G06F 9/4893 |
| 2024/0264229 A1* | 8/2024 | Srinivasan | H03K 19/017509 |

* cited by examiner

| bit7 | bit6 | bit5 | bit4~bit0 |
|------|------|------|-----------|
| 1    | 1    | 0    | 01011     |

| bit7 | bit6 | bit5 | bit4~bit0 |
|------|------|------|-----------|
| 1    | 0    | 1    | 01011     |

| bit7 | bit6 | bit5 | bit4~bit0 |
|------|------|------|-----------|
| 0    | 1    | 0    | 01011     |

ELECTRONIC DEVICE AND POWER SWITCHING CONTROL METHOD

CROSS-REFERENCE TO RELATED APPLICATION

This application claims the priority benefit of Taiwanese application serial no. 112106985, filed on Feb. 24, 2023. The entirety of the above-mentioned patent application is hereby incorporated by reference herein and made a part of this specification.

BACKGROUND

Technical Field

The disclosure relates to an electronic device and a power switching control method thereof.

Description of Related Art

In settings of an existing computer system, in a case where the computer system cannot operate normally or fails, a user may force the system to shut down by long-pressing a power button, so as to try to solve the problem. However, when a basic input/output system (BIOS) is updated, if the user forces the system to shut down, it may cause abnormality in or damage to the system due to incomplete update of the BIOS or abnormal termination of the program.

SUMMARY

The disclosure provides an electronic device including a basic input/output system (BIOS), an embedded controller, and a control chip. The BIOS is configured to generate a first handshake command when executing an update mode. The embedded controller is coupled to the BIOS and includes a general-purpose input-output (GPIO) pin. The embedded controller performs a handshake procedure with the BIOS according to the first handshake command, and determines a voltage level of the GPIO pin according to the first handshake command. The control chip is coupled to the GPIO pin of the embedded controller, and is configured to determine a power switching waiting time of a power switching unit according to the voltage level of the GPIO pin.

The disclosure provides a power switching control method including following steps: generating a first handshake command by a BIOS when executing an update mode; performing a handshake procedure with the BIOS by an embedded controller according to the first handshake command, and determining a voltage level of a GPIO pin according to the first handshake command; and determining a power switching waiting time of a power switching unit by a control chip according to the voltage level of the GPIO pin.

Based on the above description, the electronic device and the power switching control method may automatically adjust a power switching waiting time of the electronic device.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 4A to FIG. 4C are schematic diagrams of an encoding structure of handshake commands according to an embodiment of the disclosure.

DESCRIPTION OF THE EMBODIMENTS

Figure 1:
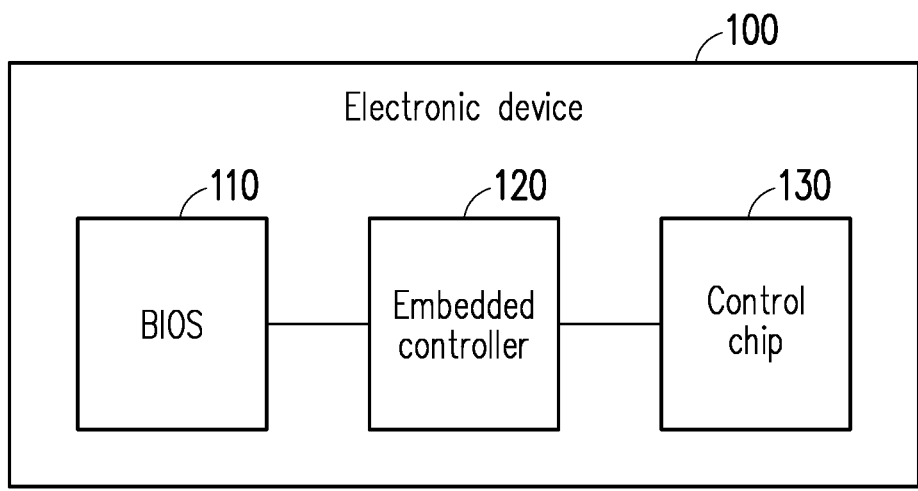
FIG. 1 is a schematic circuit diagram of an electronic device according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Referring to FIG. 1, an electronic device 100 includes a basic input/output system (BIOS) 110, an embedded controller (EC) 120 and a control chip 130. The embedded controller 120 is coupled to the BIOS 110 and the control chip 130. In the embodiment, the electronic device may be, for example, a computer device, and has a power switching unit. The computer device may be, for example, a personal computer (PC), a notebook computer or a tablet computer, etc. The power switching unit may be implemented by, for example, a power key with a physical key structure or a virtual power key implemented by a human machine interface (HMI) with a touch function.

In the embodiment, when the BIOS 110 executes an update mode, the BIOS 110 may perform a handshake procedure with the embedded controller 120, such that the embedded controller 120 may simultaneously control the control chip 130 to adjust a power switching waiting time of the power switching unit. In the embodiment, the power switching waiting time is applied to the electronic device 100 to perform a shutdown procedure (or system reset) when the power switching unit is continuously pressed by a user for more than the power switching waiting time. The update mode means that the BIOS 110 is performing firmware update, but the disclosure is not limited thereto.

In the embodiment, the embedded controller 120 may include a general-purpose input-output (GPIO) pin, and the embedded controller 120 may be coupled (electrically connected) to the control chip 130 through the GPIO pin. The control chip 130 is further coupled to the power switching unit. In the embodiment, the embedded controller 120 may control the control chip 130 to adjust the power switching waiting time of the power switching unit by switching a voltage level of the GPIO pin.

In the embodiment, when the BIOS 110 executes the update mode, the BIOS 110 may notify the embedded controller 120, such that the embedded controller 120 may control the control chip 130 to extend the power switching waiting time of the power switching unit. In this way, when the BIOS 110 executes the update mode, the accidental shutdown of the electronic device 100 may be effectively avoided, thereby effectively ensuring the electronic device 100 to be able to boot normally in subsequent use, and/or effectively completing firmware or system update.

Figure 2:
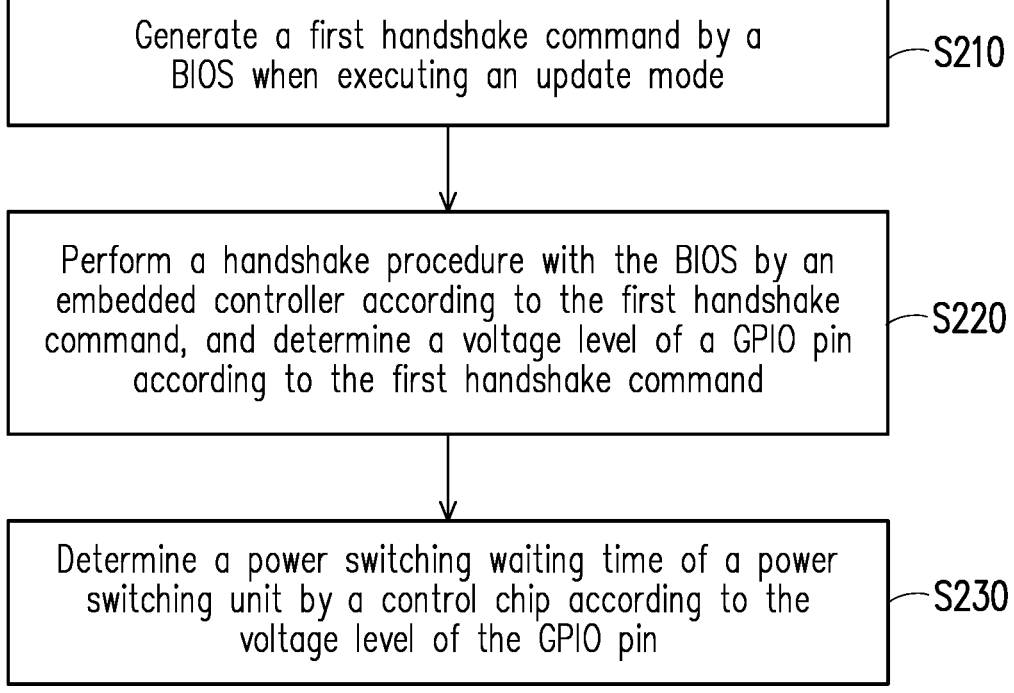
FIG. 2 is a flowchart of a power switching control method according to an embodiment of the disclosure.
Figure 3:
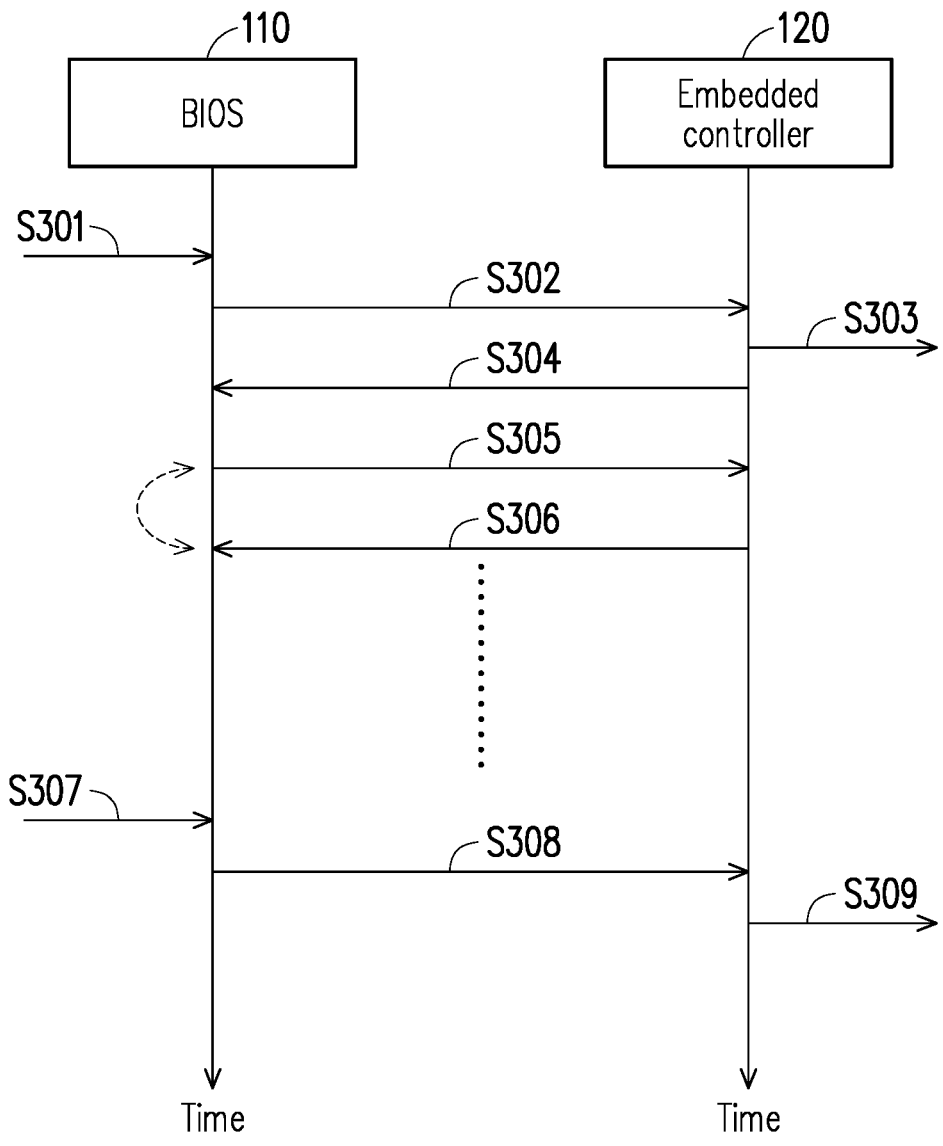
FIG. 3 is an operation flowchart of a handshake procedure according to an embodiment of the disclosure.

Referring to FIG. 1 and FIG. 2, the electronic device 100 may execute following steps S210 to S230. In step S210, when executing the update mode, the BIOS 110 may generate a first handshake command. In the embodiment, the BIOS 110 may output the first handshake command to the embedded controller 120 to notify the embedded controller 120 to perform a handshake procedure. In step S220, the embedded controller 120 performs the handshake procedure with the BIOS 110 according to the first handshake command, and determines a voltage level of the GPIO pin according to the first handshake command. In the embodiment, the embedded controller 120 may generate a second handshake command according to the first handshake command, and transmit the second handshake command back to the BIOS 110. The first handshake command and the second handshake command have a same encoding structure. The BIOS 110 and the embedded controller 120 may repeatedly transmit the first handshake command and the second handshake command to each other to implement information exchange.

In step S230, the control chip 130 determines the power switching waiting time of the power switching unit according to the voltage level of the GPIO pin. In the embodiment, the embedded controller 120 may change the voltage level of the GPIO pin according to the first handshake command, such that the control chip 130 may accordingly adjust the power switching waiting time of the power switching unit according to the change of the voltage level of the GPIO pin.

In the embodiment, when executing the update mode, the embedded controller 120 may enable the GPIO pin to have a first voltage level (such as a high voltage level or a low voltage level), such that the control chip 130 may set the power switching waiting time to a first time length according to the first voltage level received from the GPIO pin of the embedded controller 120. When the update mode is not executed or execution of the update mode is finished (completed), the embedded controller 120 may enable the GPIO pin to have a second voltage level (such as a low voltage level or a high voltage level), such that the control chip 130 may set the power switching waiting time to a second time length according to the second voltage level received from the GPIO pin of the embedded controller 120. In the embodiment, the first time length is greater than the second time length.

In the embodiment, when execution of the update mode is finished, the BIOS 110 may output a third handshake command to the embedded controller 120 to notify the embedded controller 120 to end the handshake procedure (i.e., to notify a result of the end of execution of the update mode). The embedded controller 120 may end the handshake procedure according to the third handshake command, and adjust again to recover the power switching waiting time of the power switching unit. The first handshake command, the second handshake command and the third handshake command have a same encoding structure.

Therefore, the power switching control method of the embodiment and the electronic device 100 executing the power switching control method may automatically extend the power switching waiting time of the power switching unit under the state of executing the update mode, so as to avoid shutdown of the electronic device 100 before the update is completed due to the accidental touch of the power switching unit by the user, which causes boot failure of the electronic device 100 (i.e. it is unable to normally execute the BIOS or start the operating system) at the next time when the user operates the electronic device 100.

FIG. 4A to FIG. 4C are schematic diagrams of an encoding structure of handshake commands according to an embodiment of the disclosure. Referring to FIG. 3 and FIG. 4A to FIG. 4C, the handshake procedure performed by the BIOS 110 and the embedded controller 120 may, for example, include the following steps S301 to S309. It should be noted first that, as shown in FIG. 4A to FIG. 4C, a first handshake command 410, a second handshake command 420, and a third handshake command 430 may have the same encoding structure, and may be, for example, 8 bits (bit) commands. Specifically, the first handshake command 410, the second handshake command 420 and the third handshake command 430 may respectively include 0 to $7^{th}$ bits (bit0 to bit7). The 0 to $4^{th}$ bits (bit0 to bit4) are used to indicate a confirmation time. In this regard, the 0 to $4^{th}$ bits (bit0 to bit4) may record binary data of "01011", which corresponds to decimal data of "11", so the confirmation time may be 11 seconds. The $5^{th}$ bit (bit5) is used to indicate whether the embedded controller 120 is in normal operation. The $6^{th}$ bit (bit6) is used to indicate whether the BIOS 110 is in normal operation and the $7^{th}$ bit (bit7) is used to indicate whether the update mode is in progress.

In step S301, the BIOS 110 executes the update mode. In step S302, the BIOS 110 outputs the first handshake command 410 to the embedded controller 120. In this regard, since the BIOS 110 is currently in normal operation and is in the update mode, the $6^{th}$ bit (bit6) and the $7^{th}$ bit (bit7) are respectively expressed as "1". The $5^{th}$ bit (bit5) is expressed as "0". The 0 to $4^{th}$ bits (bit0 to bit4) are expressed as "01011". In step S303, the embedded controller 120 may learn that the update mode is currently executed according to the $7^{th}$ bit (bit7) of the first handshake command 410 being "1", so the voltage level of the GPIO pin is correspondingly changed (switched from the second voltage level to the first voltage level), so as to control the control chip 130 to adjust the power switching waiting time of the power switching unit accordingly. Moreover, the embedded controller 120 may learn that the BIOS 110 is in normal operation according to the $6^{th}$ bit (bit6) of the first handshake command 410.

In step S304, the embedded controller 120 may reply the second handshake command 420 to the BIOS 110 according to the first handshake command 410. The embedded controller 120 may reset the $6^{th}$ bit (bit6) to "0", and set the $5^{th}$ bit (bit5) to "1", to indicate that the embedded controller 120 is in normal operation.

In step S305, if the BIOS 110 receives the second handshake command 420 from the embedded controller 120 within a preset time, the BIOS 110 continues to perform the handshake procedure. Conversely, if the BIOS 110 does not receive the second handshake command 420 from the embedded controller 120 within the preset time, the BIOS 110 stops performing the handshake procedure. Moreover, when the update mode is continued, the BIOS 110 may learn that the embedded controller 120 is in normal operation according to the $5^{th}$ bit (bit5) of the second handshake command 420, and the BIOS 110 may reset the $5^{th}$ bit (bit5) of the second handshake command 420 to "0", and set the $6^{th}$ bit (bit6) to "1" to generate a (next) first handshake command 410 and indicate that the BIOS 110 is in normal operation. In the embodiment, taking the aforementioned confirmation time of 11 seconds as an example, the BIOS 110 may output the (next) first handshake command 410 to the embedded controller 120 within 11 seconds after receiving the second handshake command 420. In other words, the BIOS 110 may output the first handshake command 410 to the embedded controller 120 every 10 seconds. Moreover, the embedded controller 120 may further determine whether the BIOS 110 is abnormal according to the confirmation time. When the embedded controller 120 does not receive the (next) first handshake command within 11 seconds, the embedded controller 120 switches the voltage level of the GPIO pin from the first voltage level to the second voltage level (such as switching from a low voltage level back to a high voltage level or switching from the high voltage level back to the low voltage level).

In step S306, the embedded controller 120 may repeatedly execute step S304 to reply the (next) second handshake command 420 to the BIOS 110 according to the (next) first handshake command 410. Deduced by analogy, the BIOS 110 and the embedded controller 120 may repeatedly execute steps S305 and S306 to exchange information.

In step S307, the execution of the update mode ends. In step S308, the BIOS 110 may output the third handshake command 430 to the embedded controller 120, such that the embedded controller 120 to end the handshake procedure according to the third handshake command. In step S309, the embedded controller 120 may learn that the execution of the update mode is completed according to the $7^{th}$ bit (bit7) of the third handshake command 430 being "0", and accordingly changes the voltage level of the GPIO pin (switching from the first voltage level to the second voltage level).

Figure 5:
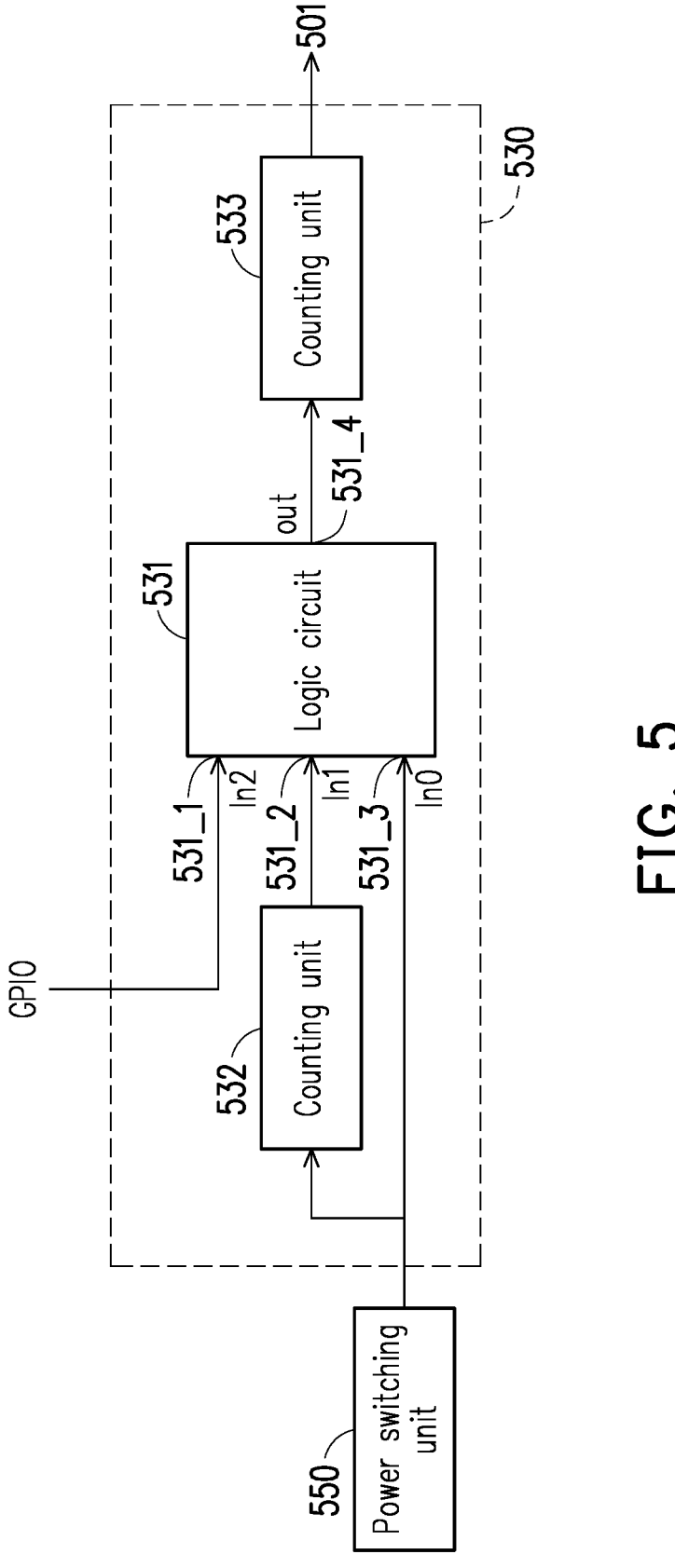
FIG. 5 is a schematic circuit diagram of a control chip according to an embodiment of the disclosure.

Referring to FIG. 5, the control chip 130 in FIG. 1 may be specifically implemented as a circuit architecture of a control chip 530 shown in FIG. 5. In the embodiment, the control chip 530 may include a logic circuit 531 and counting units 532, 533. The counting units 532, 533 may be, for example, composed of counters and/or delay generators. The counting unit 532 may provide a signal delay effect of a first delay time. The counting unit 533 may provide a signal delay effect of a second delay time. To be specific, when the counting units 532, 533 continuously receive signals of a low voltage level (i.e., corresponding to a bit value "0"), the counting units 532, 533 may respectively perform counting according to the first delay time and the second delay time, and respectively output a signal of the low voltage level (i.e., corresponding to the bit value "0") after counting over the first delay time and the second delay time. If the counting units 532, 533 respectively stop receiving the signal of the low voltage level (i.e., corresponding to the bit value "0") before counting over the first delay time and the second delay time, the counting units 532, 533 stop counting, and re-count when receiving the signal of the low voltage level (i.e., corresponding to the bit value "0") next time.

In the embodiment, the logic circuit 531 includes input pins 531_1 to 531_3 and an output pin 531_4, and is used to execute a look up table. The input pin 531_1 is coupled to the GPIO pin GPIO. The input pin 531_2 is coupled to the counting unit 532. The input pin 531_3 is coupled to the power switching unit 550. The output pin 531_4 is coupled to the counting unit 533.

In the embodiment, the logic circuit 531 executes a look up table (LUT) according to a plurality of voltage levels of the input pins 531_1 to 531_3, so as to connect to the counting unit 533 through the output pin 531_4 according to a look up result, and after counting (delay) of the counting unit 533, the counting unit 533 outputs a control signal 501. In the embodiment, the logic circuit 531 may obtain corresponding bit values In0 to In2 according to the voltage levels and output a voltage level corresponding to a bit value out through the output pin 531_4. In the embodiment, the counting unit 533 may delay outputting the control signal 501 to a power module or a BIOS of the electronic device, such that the electronic device is shut down according to the control signal 501. In the embodiment, the look up table may be a 3-bit look up table, and may be as shown in table 1 below.

TABLE 1

| In0 | In1 | In2 | Out |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 1 |
| 1 | 0 | 1 | 1 |
| 1 | 1 | 0 | 1 |
| 1 | 1 | 1 | 1 |

In the embodiment, when the user does not trigger the power switching unit 550, the power switching unit 550 may, for example, provide a high voltage level to the input pin 531_3, such that the logic circuit 531 may obtain information of the bit value In0 of "1" according to the high voltage of the input pin 531_3. Comparatively, when the user triggers the power switching unit 550, the power switching unit 550 may, for example, provide a low voltage level to the input pin 531_3, such that the logic circuit 531 obtains information of the bit value In0 of "0" according to the low voltage level of the input pin 531_3. The counting unit 532 may delay by a first time to output the voltage level to the input pin 531_2, such that the logic circuit 531 may obtain information of the bit value In1 of "0" or the bit value of "1" according to the first time delay of the input pin 531_2. Moreover, when the GPIO pin GPIO provides a low voltage level to the input pin 531_1, the logic circuit 531 obtains information of the bit value In2 of "0" according to the low voltage level of the input pin 531_1. Comparatively, when the GPIO pin GPIO provides a high voltage level to the input pin 531_1, the logic circuit 531 obtains information of the bit value In2 of "1" according to the high voltage level of the input pin 531_1.

In the embodiment, when the update mode is executed, the power switching waiting time is equal to a sum of the first delay time of the counting unit 532 and the second delay time of the counting unit 533. When the update mode is not executed, the power switching waiting time is equal to the second delay time.

For example, taking the first delay time as 50 seconds and the second delay time as 14 seconds as an example, when the update mode is not executed and the user does not trigger the power switching unit 550, the logic circuit 531 obtains information of the bit values In0 to In2 of "110" according to the voltage levels of the input pins 531_1 to 531_3. At this time, the logic circuit 531 may output the high voltage level corresponding to the bit value out of "1" to the counting unit 533 according to a look up result of the above table 1. Moreover, the counting unit 533 outputs the control signal 501 of the high voltage level corresponding to the bit value out of "1" to the power module or the BIOS of the electronic device.

When the update mode is not executed and the user continuously triggers the power switching unit 550 (i.e., the user presses the power button for a long time), at a $0^{th}$ second, the logic circuit 531 obtains information of the bit values In0 to In2 of "010" according to the voltage levels of the input pins 531_1 to 531_3. At this time, the logic circuit 531 may output the low voltage level corresponding to the bit value out of "0" to the counting unit 533 according to the look up result of the above table 1. Moreover, the counting unit 533 outputs the control signal 501 of the high voltage level corresponding to the bit value out of "1" to the power module or the BIOS of the electronic device. At a 14$^{th}$ second, the logic circuit 531 still obtains the information of the bit values In0 to In2 of "010" according to the voltage levels of the input pins 531_1 to 531_3. At this time, the logic circuit 531 may output the low voltage level corresponding to the bit value out of "0" to the counting unit 533 according to the look up result of the above table 1. Moreover, after the delay or counting by the counting unit 533, the control signal 501 of the low voltage level corresponding to the bit value out of "0" is output to the power module or the BIOS of the electronic device. In this way, after the user triggers the power switching unit 550 continuously for 14 seconds, the electronic device may be shut down according to the control signal 501 output by the control chip 530.

When the update mode is executed and the user continuously triggers the power switching unit 550 (i.e., the user presses the power button for a long time), at the 0$^{th}$ second, the logic circuit 531 obtains the information of the bit values In0 to In2 of "011" according to the voltage levels of the input pins 531_1 to 531_3. At this time, the logic circuit 531 may output the high voltage level corresponding to the bit value out of "1" to the counting unit 533 according to the look up result of the above table 1. Moreover, the counting unit 533 outputs the control signal 501 of the high voltage level corresponding to the bit value out of "1" to the power module or the BIOS of the electronic device. At a 50$^{th}$ second, after delay or counting, the counting unit 532 outputs the low voltage level corresponding to the bit value out of "0" to the input pin 531_2, and the logic circuit 531 obtains information of the bit values In0 to In2 of "001" according to the voltage levels of the input pins 531_1 to 531_3. At this time, the logic circuit 531 may output the low voltage level corresponding to the bit value out of "0" to the counting unit 533 according to the look up result of the above table 1. Moreover, the counting unit 533 outputs the control signal 501 of the high voltage level corresponding to the bit value out of "1" to the power module or the BIOS of the electronic device. At a 64$^{th}$ (50+14) second, the logic circuit 531 still obtains the information of the bit values In0 to In2 of "001" according to the voltage levels of the input pins 531_1 to 531_3. At this time, the logic circuit 531 may output the low voltage level corresponding to the bit value out of "0" to the counting unit 533 according to the look up result of the above table 1. Moreover, after the delay or counting by the counting unit 533, the control signal 501 of the low voltage level corresponding to the bit value out of "0" is output to the power module or the BIOS of the electronic device. In this way, after the user triggers the power switching unit 550 continuously for 64 seconds, the electronic device may be shut down according to the control signal 501 output by the control chip 530.

When the update mode is executed and the user accidentally touches and temporarily triggers the power switching unit 550 (i.e., the user presses the power button for a long time), at the 0$^{th}$ second, the logic circuit 531 obtains the information of the bit values In0 to In2 of "011" according to the voltage levels of the input pins 531_1 to 531_3. At this time, the logic circuit 531 may output the high voltage level corresponding to the bit value out of "1" to the counting unit 533 according to the look up result of the above table 1. Moreover, the counting unit 533 outputs the control signal 501 of the high voltage level corresponding to the bit value out of "1" to the power module or the BIOS of the electronic device. At a 25$^{th}$ second, the user releases the power switching unit 550, such that the logic circuit 531 obtains information of the bit values In0 to In2 of "111" according to the voltage levels of the input pins 531_1 to 531_3. At this time, the logic circuit 531 may output the high voltage level corresponding to the bit value out of "1" to the counting unit 533 according to the look up result of the above table 1. Moreover, the counting unit 533 stops the previous counting, and outputs the control signal 501 of the high voltage level corresponding to the bit value out of "1" to the power module or the BIOS of the electronic device.

In summary, in the electronic device and the power switching control method of the disclosure, during a process that the BIOS executes the update mode, the BIOS may simultaneously perform a handshake procedure with the embedded controller, such that the embedded controller may automatically control the control chip to adjust the power switching waiting time. In this way, it may effectively avoid accidental shutdown of the electronic device when the update procedure of the BIOS has not been completed, thereby effectively ensuring the electronic device to be able to boot normally in subsequent use.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. An electronic device, comprising:
a basic input/output system (BIOS), configured to generate a first handshake command when executing an update mode;
an embedded controller, coupled to the BIOS and comprising a general-purpose input-output (GPIO) pin, wherein the embedded controller performs a handshake procedure with the BIOS according to the first handshake command, and determines a voltage level of the GPIO pin according to the first handshake command; and
a control chip, coupled to the GPIO pin of the embedded controller, and configured to determine a power switching waiting time of a power switching unit according to the voltage level of the GPIO pin,
wherein the embedded controller transmits back a second handshake command to the BIOS according to the first handshake command, wherein the first handshake command and the second handshake command have a same encoding structure.

2. The electronic device according to claim 1, wherein the first handshake command comprises a plurality of bits for indicating a confirmation time, and when the embedded controller does not receive a next first handshake command within the confirmation time, the embedded controller switches the voltage level of the GPIO pin.

3. The electronic device according to claim 2, wherein the first handshake command further comprises another plurality of bits for indicating whether the embedded controller is operating normally, whether the BIOS is operating normally, and whether the BIOS is executing the update mode.

4. The electronic device according to claim 1, wherein when execution of the update mode ends, the BIOS outputs a third handshake command to the embedded controller, such that the embedded controller ends the handshake procedure according to the third handshake command, wherein the first handshake command and the third handshake command have a same encoding structure.

5. The electronic device according to claim 1, wherein when the update mode is executed, the GPIO pin has a first voltage level, such that the control chip sets the power switching waiting time to a first time length, and when the update mode is not executed, the GPIO pin has a second voltage level, such that the control chip sets the power switching waiting time to a second time length, wherein the first time length is greater than the second time length.

6. The electronic device according to claim 1, wherein the control chip comprises:

a first counting unit, coupled to the power switching unit;

a second counting unit; and a logic circuit, comprising a first input pin, a second input pin, a third input pin, and an output pin, and is configured to execute a look up table, wherein the first input pin is coupled to the GPIO pin, the second input pin is coupled to the first counting unit, the third input pin is coupled to the power switching unit, and the output pin is coupled to the second counting unit, wherein the logic circuit executes the look up table according to a plurality of voltage levels of the first input pin, the second input pin, and the third input pin, to output a control signal to the second counting unit through the output pin according to a look up result, and the second counting unit delays outputting the control signal.

7. The electronic device according to claim 6, wherein when the update mode is executed, the power switching waiting time is equal to a sum of a first delay time of the first counting unit and a second delay time of the second counting unit, and wherein when the update mode is not executed, the power switching waiting time is equal to the second delay time.

8. The electronic device according to claim 1, wherein the power switching unit is a power key of the electronic device, and when the power key is pressed continuously for more than the power switching waiting time, the electronic device executes a shutdown procedure.

9. The electronic device according to claim 1, wherein the update mode is the BIOS updating firmware.

10. A power switching control method, applied to an electronic device, and comprising:

generating a first handshake command by a basic input/output system (BIOS) when executing an update mode;

performing a handshake procedure with the BIOS by an embedded controller according to the first handshake command, and determining a voltage level of a general-purpose input-output (GPIO) pin according to the first handshake command;

determining a power switching waiting time of a power switching unit by a control chip according to the voltage level of the GPIO pin; and when execution of the update mode ends, outputting a second handshake command to the embedded controller by the BIOS, such that the embedded controller ends the handshake procedure according to the second handshake command, wherein the first handshake command and the second handshake command have a same encoding structure.

11. The power switching control method according to claim 10, further comprising:

transmitting back a third handshake command to the BIOS by the embedded controller according to the first handshake command, wherein the first handshake command and the third handshake command have a same encoding structure.

12. The power switching control method according to claim 10, wherein the first handshake command comprises a plurality of bits for indicating a confirmation time, and when the embedded controller does not receive a next first handshake command within the confirmation time, the embedded controller switches the voltage level of the GPIO pin.

13. The power switching control method according to claim 12, wherein the first handshake command further comprises another plurality of bits for indicating whether the embedded controller is operating normally, whether the BIOS is operating normally, and whether the BIOS is executing the update mode.

14. The power switching control method according to claim 10, wherein when the update mode is executed, the GPIO pin has a first voltage level, such that the control chip sets the power switching waiting time to a first time length, and when the update mode is not executed, the GPIO pin has a second voltage level, such that the control chip sets the power switching waiting time to a second time length, wherein the first time length is greater than the second time length.

15. The power switching control method according to claim 10, wherein the control chip comprises a first counting unit coupled to the power switching unit, a second counting unit, and a logic circuit, wherein a first input pin of the logic circuit is coupled to the GPIO pin, a second input pin of the logic circuit is coupled to the first counting unit, a third input pin of the logic circuit is coupled to the power switching unit, and an output pin of the logic circuit is coupled to the second counting unit, wherein determining the power switching waiting time of the power switching unit by the control chip according to the voltage level of the GPIO pin comprises:

executing a look up table by the logic circuit according to a plurality of voltage levels of the first input pin, the second input pin, and the third input pin; and outputting a control signal to the second counting unit by the logic circuit through the output pin according to a look up result, and delaying outputting the control signal by the second counting unit.

16. The power switching control method according to claim 15, wherein when the update mode is executed, the power switching waiting time is equal to a sum of a first delay time of the first counting unit and a second delay time of the second counting unit, and wherein when the update mode is not executed, the power switching waiting time is equal to the second delay time.

17. The power switching control method according to claim 10, wherein the power switching unit is a power key of the electronic device, and when the power key is pressed continuously for more than the power switching waiting time, the electronic device executes a shutdown procedure.

18. The power switching control method according to claim 10, wherein the update mode is the BIOS updating firmware.

* * * * *